3,809,568
DECORATIVE PLASTIC FINISH
John Thomas Askew, Fountain Valley, Calif., assignor to
 Flashbacks, Fountain Valley, Calif.
No Drawing. Filed Jan. 19, 1972, Ser. No. 218,953
 Int. Cl. B41m 1/28, 1/30
U.S. Cl. 117—38                                          10 Claims

ABSTRACT OF THE DISCLOSURE

A decorative plastic finish process and product particularly for use on plastic film and sheeting, especially polystyrene and polybutyrate sheeting. Plastic sheet or shaped articles are first metallized e.g. by vacuum deposition to deposit a thin, adherent layer of metal, for example aluminum, on the plastic surface. The metallized plastic is then printed in whole or in part, depending on the desired configuration with a transparent ink by means of a silk screen. After passing briefly through a forced air drying oven, the printed surface can be overprinted with additional layers of transparent ink, if desired, by the same method. Each printing of transparent ink is thoroughly dried before each overprinting. By a preferred embodiment, a final coat of clear lacquer is applied and oven dried.

The decorative plastic product is characterized by a plastic substrate, a first thin layer of metal, at least one overlayer of transparent ink covering at least a part of the first metallized layer, and, preferably, a final finish coat of clear lacquer to protect and seal the surface. The resulting surface is highly brilliant and lustrous due to the reflective quality of the metallizing layer penetrating and shining through the applied transparent inks and clear lacquor coat.

BACKGROUND OF THE INVENTION

Field of the invention

This invention relates to the art of decorative plastic finishes and particularly to the production of highly reflective finishes having exceptional eye appeal and which are particularly useful in the advertising field.

Description of the prior art

In recent years there has been considerable demand by members in the advertising field and their customers for new and highly imaginative ways to present products to the public at large. With the advent of psychology into the advertising area, colors have assumed great importance together with the mode and design of presentation.

Paper has been the most widely used base material for the advertising medium. However, technological improvements have reduced the cost of plastics to the point of being competitive with paper and in some instances even less expensive. Plastics, particularly for use in posters or packaging materials, provide significant advantages over paper. Some of these advantages include clarity, toughness, flexibility, or rigidity depending on the plastic and its thickness, heat and water resistance and insulation.

Unfortunately, imparting colors to plastics often involves very complicated technology requiring specific selection of compatible colorants, plasticizers, pigments, dyes, dispersing agents and the like specific to each plastic. Furthermore, it is difficult to produce a specific desired color.

Printing on plastics has been fraught with problems of adherence to the plastic surface due to its impervious nature, attack on the plastic by the ink solvent and other associated problems relating to the chemical nature of the plastic and of the particular ink.

In packaging, display products, and decorative materials, graphics are very important. The use of silk screening methods have been found to be most satisfactory for transfer of graphic art to a plastic surface. However, the inks and paints used present the same problems of adherence and attack encountered with standard forms of printing. In addition, graphic displays require even more precision in color selection to achieve desired effects and eye appeal. Brilliance of presentation has always been an elusive goal for the graphic artist especially for use on plastic surfaces. Developments in vacuum deposition have made possible the relatively inexpensive deposition of relatively thin, adherent films or layers of metal on certain plastics. By this method, metals such as aluminum which is relatively inexpensive, are deposited as well as more expensive metals such as platinum, rhodium, and chromium. A brilliant, lustrous surface finish is produced by vacuum deposition. Unfortunately, vacuum deposition is not suitable for transfer of graphic arts to a plastic surface since only one color can practically be deposited on the plastic surface by this method. In painting the metallized surface, the eye catching metallic luster is lost. As a consequence, until the present time, there has been no simple, effective method for transfer of graphic arts to plastic substrates, using many different colors while retaining the metallic brilliance of a metallized surface deposit.

SUMMARY OF THE INVENTION

The above desirable aspects have now been embodied in a simple process which utilizes the metallic brilliance and luster of a metallized plastic surface without limiting the use of many different colors.

The process includes first metallizing a plastic surface, for example sheet, film, or a molded configuration, to deposit a substantially uniform, thin, adherent metal film or layer thereon. The metallizing process can include, for example, electroplating and vacuum deposition using such metals as aluminum and chromium.

The metallized plastic surface is then printed with the desired configuration by a silk screen process using various colored and colorless transparent inks which allow the brilliant, reflective qualities of the metallized plastic surface to shine through the applied inks.

The inks are then dried on the metallized plastic surface, usually by passage through a forced air drying oven for a brief period. Additional printings with transparent ink can then be applied if desired in the same maner followed by thorough drying.

By a preferred embodiment a final coating of clear lacquer is applied overall, and oven dried to protect and seal the colored surface.

Thus, the finished product is characterized by a plastic surface or substrate, a think film or layer of metal, and at least one overprinting layer of transparent ink covering at least a part of the first metallized layer, and preferably, a final finish coat or layer of lacquer protecting and sealing the surface. The final product appears as a highly decorative, brilliant, lustrous surface which is achieved by the reflective quality of the metal layer penetrating and shining through the transparent inks and clear lacquer coat.

By means of the invention, then, a simple, economical method is provided which enables utilization of the reflective qualities of a metallized plastic surface to produce a new product having unusual eye appeal.

A new medium is provided by means of the invention, for artists working in the field of original design. Numerous combinations are made possible by this invention by providing new ways of utilizing the brilliance and luster of metallic surfaces in conjunction with color. At the same time, additional advantages are provided, depending upon the specific nature of the plastic surface and including such qualities as toughness, flexibility or rigidity, heat and water resistance, and insulation.

Finally, from an aesthetic standpoint, the invention provides new dimensions into the beauty of color, design and artistry.

DETAILED DESCRIPTION OF THE INVENTION INCLUDING PREFERRED EMBODIMENTS

As noted supra, the first step of the invention includes first metallizing a plastic surface to deposit a substantially uniform, thin, adherent metal film or layer thereon, which provides the plastic surface with a highly brilliant, lustrous surface. As used herein and in the claims, "metallizing" is meant to describe a process of depositing a metal layer or film.

Metallizing can be achieved by any one of several methods including, for example, by spraying, electroplating, and vacuum deposition. As many as eighty metals or more can be deposited on a plastic surface by one of these methods. The most common metals deposited include among others, nickel, copper, chrome, gold, brass, bronze, zinc, aluminum, platinum and rhodium. Of those mentioned, aluminum and chromium are most often used because of the economy of the latter.

Of the methods mentioned for metallizing, vacuum deposition is the most preferred because of its low cost in comparison with other methods. In the process of vacuum deposition of metals, the plastic surface is first rendered free of contaminants, such as surface moisture, mold lubricant, excess surface plasticizer, humidity, dust, skin oils and other contaminants. Usually, a lacquer base coat is then applied over the plastic surface by a method such as dipping or flow coating. The base coat of lacquer eliminates surface defects such as striations or mold parting lines and also seals the pores of the material, thus minimizing the gas liberated under vacuum. In addition, the base coat improves bonding of deposited metal to the plastic surface or substrate and provides initial gloss. Certain types of plastics are chemically treated prior to metallizing to improve the metal to plastic bond. For example, polyethylene and polypropylene are chemically surface etched prior to metallizing by vacuum deposition; and nylon and related plastics are baked to remove water before the lacquer base coat is applied. The base coat of lacquer is then dried as by passage through a drying oven at temperatures which are compatible with the plastic surface or substrate.

Upon completion of the drying step, the plastic articles or sheets are placed in a chamber which is usually about two to seven feet in diameter and which contains central coils or zigzag patterns of tungsten filament. As many as twenty-four filaments are used. Staples of the metal to be deposited are loaded onto the filaments.

About ten to thirty minutes is normally required for the entire vacuum deposition process to take place. Most of this time involves pump down, while the actual coating or deposition takes only ten to twenty seconds. It has been found that best results are obtained using defusion pumps which maintain a vacuum of less than about 150 microns on their forced pressure sides. Actual vacuum deposition of the metal on the plastic substrate takes place by heating of the tungsten filaments by means of electric current to incandescence at a point in the cycle when the required vacuum level is reached. Raising filament temperature even higher causes the metal to vaporize and radiate through the chamber and condense on the cooler plastic surfaces to form the required metal deposit or coating.

Frequently, after removal of the metallized plastic products from the chamber, a clear lacquer overcoat is applied to the metallized surfaces thereof to seal and protect the surfaces from scratching. Drying of the final overcoating of lacquer finishes the vacuum deposition process.

The process of electroplating includes several steps. The plastic surface to be electroplated is first cleaned of surface contaminants, followed by a chemical etch. As in vacuum deposition, certain of the plastics which are to be electroplated are necessarily subjected to additional treatment prior to electroplating. For example, polysulfone must be annealed prior to cleaning and chemical etch. After chemically etching the plastic surface, a neutralizing compound is applied to neutralize excess acid. Next, the neutralized, etched surfaces are "seeded" with an inactive noble metal catalyst and an accelerator for the catalyst. The seeded etched plastic surfaces are then placed in an electroless solution containing metal salts and reducing agents where the noble metal "seeds" catalyze the reaction between the metal salts and reducing agents resulting in a uniform deposition of metal over the treated plastic surface. The reaction continues autocatalytically once it begins. Normal electroless metal deposits on plastic vary from about ten to about thirty millionths of an inch.

Virtually any plastic surface can be used in the invention process as long as the plastic is capable of being metallized. Examples of such plastics include among others: polyethylenes, polyvinyls, polystyrenes, polypropylenes, acrylics, PPO (polyphenylene oxide), polyesters, ABS (acrylonitrile-butadiene-styrene), nylons, polycarbonates, polyurethanes, polyvinyl fluorides, polyimides, polybutyrates, polysulfones, cellulose acetates, cellulose acetate butyrates, melamines, and phenolics.

The above plastics are intended to be illustrative of those plastics which can be used in the invention process and are not intended to be all inclusive. Of the above-mentioned materials, polystyrenes, cellulose acetates, polyvinyls, acrylics and polybutyrates in sheet and film form are most preferred for use in producing decorative finishes according to the invention.

The thin metal film deposited on the plastic surface is subject to scratches and abrasions. Therefore, it is preferred to overcoat the metal film with a clear lacquer to protect the somewhat the delicate finish thereof. However, such a step is not necessary.

According to the invention, the metallized plastic surface is next printed by a silk screen process using transparent inks. As is well known, silk screening is basically a stencil process in which printing ink is forced, for example with a roller or squeegee through the meshes of a silk or organdy screen stretched on a frame, onto the material to be printed which is placed beneath the screen. The screen is prepared prior to printing for example by blocking out with tusche and glue to provide a pervious printing area and impervious non-printing area or areas. Various materials can be used for the screen in place of silk, as for example, monofilament nylon, multifilament polyester, and metal wire cloth.

In order to utilize the metallic luster and brilliance of a metallized plastic surface, transparent inks must be used. By "transparent" is meant having the property of transmitting light without appreciable scattering, so that bodies lying beyond are entirely visible.

Inks are fluid or viscous materials of various colors composed mainly of pigments or dyes in a suitable vehicle together with minor amounts of driers, resins, gums, antistatic agents, flow-control agents, solvents, diluents, plasticizers, ultra-violet absorbers, flame retardants, stabilizers, antioxidants, and various other materials used to improve properties such as flow, adhesion, weatherability and the like.

Pigments and dyes are various inorganic and organic, natural and synthetic chemical substances and mixtures which impart a color, including black and white to other materials.

According to the widely used Munsell terminology, "hue" is that quality by which color families are distinguished; "value" is the degree of lightness or darkness of color, and "chroma" is the intensity of a distinct hue or the degree of color departure from gray of the same likeness.

Additional terms widely used in color technology include "strength" which is defined as that quantity of color which when combined with a fixed weight of prime light (titanium dioxide) will give a depth of shade equal to the shade obtained with the given weight of some other color of similar hue with the same weight of prime light; and "opacity" which is a measure of a colorant's ability to stop transmission of light to a system in which it is used. Conversely, "transparency" occurs when almost all light is transmitted through the object, as with clear acrylic plastic. With a colored transparent plastic, the colorant present reflects a portion of the light striking an object while transmitting the rest. Color is determined by the specific wave length reflected.

Pigments are the most widely used colorants. As a class, inorganic pigments are generally more opaque and lower in chroma than most organic pigments or dyes. By comparison, organic pigments are higher in chroma, stronger and more trasnparent. The difference between pigments and dyes has classically been based upon the solubility of pigments. However, there is no definite way of distinguishing between pigments and dyes on either a chemical or solubility basis. In general, a dye is solubilized in the system being colored whereas the pigment is dispersed as a finely divided solid. Also, in general, dyes are stronger, more transparent, and more soluble in solvents and plastic resins than pigments.

Dyes and pigments are supplied by manufacturers in both dry and wet form. Pigments containing minor amounts of diluents are called "toners" if organic pigments, or "pures" if inorganic pigments. One form of dry pigment is called a "lake" and is formed by diluting a toner pigment with a colorless extender such as calcium carbonate, alumina hydrate, clay, barium sulphate or metal resinates.

The main difference between opaque inks and transparent inks is the percentage of the pigment or dye used and in some cases the particle size. Transparent inks usually contain pigment which has been ground extra fine and in substantially smaller amounts than that present in opaque inks.

Vehicles used in inks include among others, nitrocellulose, acrylic resins, vinyl resins, alkyd resins, shellac, rubber derivatives, mineral oil, heat bodied linseed, varnishes ranging from very thin to very viscous, china wood, perilla, hempseed and cotton seed oils, phenolformaldehyde resins, polyvinyl acetate and other synthetic resins. When nitrocellulose and similar cellulose esters or ethers are used as the vehicle, the derivative is known as a lacquer. Alkyd resins are often used in conjunction with nitrocellulose.

In addition to the pigments and vehicles mentioned above, various solvents are also commonly used in formulating inks. Examples of solvents which can be used include ethyl alcohol, methylisobutyl ketone, butylacetate, toluene, xylene, acetone and glacial acetic acid mixtures, ether-alcohol mixtures, and methanol. Glycol ethers are often used to improve gloss, flowout, and blush resistance of nitrocellulose and other resin based coatings. Specific glycol ethers used which are slow to evaporate include ethylene glycol monomethyl ether, ethylene glycol monoethyl ether, ethylene glycol monobutyl ether, diethylene glycol monomethyl ether, and diethylene glycol monobutyl ether. Ketones which are active solvents for cellulosic, vinyl, alkyd and acrylic resins, include for example acetone, methyl ethyl ketone, and methyl isobutyl ketone. Hydrocarbon solvents, for example hexane, heptane, benzene, toluene, xylene (mixed), are particularly used as diluents for cellulosic lacquers; and, nitroparaffins.

The use of linseed or linoleic acid or other drying oil produces an ink which dries by oxidation, while the use of saturated oils and derivatives gives an ink which does not dry by oxidation. Inks which dry by the evaporation of solvents are faster drying than those which dry by oxidation. Still other inks dry by solvent evaporation and others through crosslinking of the resinous portions.

Preferred transparent inks for use in the process according to the invention include those transparent inks containing colorants which are transparent at normal concentrations of use, and which use as the vehicle preferably nitrocellulose, vinyl resins, acrylic resins and mixtures thereof, sometimes in conjunction with alkyd resins.

The exact choice of the transparent ink to be used will depend upon its formulation and the nature of the plastic. Certain transparent inks will naturally perform better on some plastics than on others. Simple experimentation will be the best guide.

Examples of colorants which are transparent in normal concentrations of use include among others given by their generic names: organic pigments including quinacridone red; quinacridone violet; lithol rubine bluish red; Na, Ca lithols maroon-light red; Ba lithol medium red; pigment scarlet bluish red; madder lake alizarine red; alizarine maroon; thioindigo, PTMA toners; methyl violet; red lake C light red; homolog-red lake C yellowish red; red lake R; dianisidine medium red; anthraquinone red, isoindolinone red; perylene; benzidine yellow anilide light yellow; benzidine yellow anisidide light yellow, benzidine yellow HR medium yellow; Hansa 10 G primrose, lt. 10 medium yellow; benzidine orange; dianisidine orange, RK anthanthrone orange; pyranthrone orange; GR perinone orange; isoindolinone orange, yellow; flavanthrone yellow; anthrapyrimidine yellow; phthalocyanine green; pigment green B dark green; indanthrone; and soluble dyes including azo yellow-red, green, blue, brown; anthraquinone yellow-red, green, blue, brown; acetate colors which includes a wide color range; acid dyes, chrome dyes and direct dyes which include a wide color range; and basic dyes which includes a wide color range.

Less preferred inorganic pigments include the following which are translucent at normal concentrations of use; ultramarine blue, green, red, pink, violet, manganese violet; cadmium sulfide yellow; and natural inorganics-siennas umbers. Lesser amounts of these pigments would be used than for those preferred colorants listed above.

After each screen printing of the metallized plastics, the transparent inks are dried, for example by passage through a drying oven at temperatures compatible with the specific plastic. Typical temperatures at which some plastics are dried without distortion are shown in Table 1, below.

TABLE 1

| Plastic: | Drying temperature, degrees |
|---|---|
| Polystyrene, cellulose acetate | 130–150 |
| Acrylic | 150–175 |
| ABS | 175–195 |
| Phenolic urea | 230–300 |
| Polycarbonate, polypropylene, polysulphone, PPO | 265–285 |

Drying ovens are preferably well ventilated to remove solvent vapors rapidly. Otherwise, a solvent-laden condition can be created in the drying oven with uneven temperature areas which can be the cause of defective printed areas. At the above-mentioned temperatures, most screen printed inks can be dried on the metallized plastic in a period of approximately three minutes.

The process of the invention permits overprinting to provide as many as eight or more coatings of transparent ink. This provides a significant advantage over prior art processes relating to printing on plastic substrates directly which are limited to two or three layers of overprinting. It will be apparent that each overprinting will be permitted to dry or be air dried prior to any additional overprinting.

Also, while the use of transparent ink on a metallized plastic surface constitutes the essence of the invention, it can be appreciated that for certain effects such as outlining figures and letters, that opaque inks will desirably be used in conjunction with transparent inks.

The final design created by the silk screening of the metallized plastic surface is, in many cases, desirably protected and sealed by means of an overcoat of clear lacquer. The clear lacquer can conveniently be applied to the finished surface by means of the silk screen or be rolled or sprayed on. As an alternative, where even greater protection is desired, and which is particularly useful for flat designs created on plastic sheeting, the final design and product can be encased in a laminate of clear plastic. The additional protection of the laminate provides increased toughness and durability and also resistance to weather and moisture.

The following examples are given for the purpose of illustrating the invention and are not intended to constitute a limitation thereof.

EXAMPLE I

Sheets of polystyrene are first sprayed with a base coat to eliminate surface defects, and to seal the pores of the plastic material. The base coat is then dried by passing through a drying oven at a temperature of 150° F., for a period of three minutes.

Next, the dry sheets are placed in a vacuum deposition chamber having a diameter of five feet and containing twenty tungsten filaments in a zigzag pattern. Staples of chromium are loaded onto the filaments and the chamber is sealed. Vacuum pumping is begun and continued until a pressure of $5 \times 10^{-4}$ mm. Hg pressure is obtained. At this point, the tungsten filaments are heated by electric current to incandescence which takes place at approximately 1200° F. This causes the chromium staples to melt and spread over the filament. Filament temperatures are then raised to quickly cause vaporization of the chrome which radiates through the chamber and is deposited on the cooler plastic surfaces to deposit a metal coating thereon.

After cooling down the vacuum deposition chamber, the metallized plastic sheets are removed and spray coated with a protective clear lacquer. The lacquer is dried on the metallized plastic by passage through a drying oven at temperatures of 150° F. for approximately two minutes. The metallized plastics are then passed beneath a silk screen and printed with a transparent blue ink having a vinyl resin base and azo blue as the colorant.

After passing the printed metallic sheets through a drying oven at a temperature of 150° F. for approximately two minutes, the plastic sheets are then overprinted with an additional coating of transparent ink. The transparent ink used also has a vinyl base and the colorant is quinacridone red. Two additional coats are then applied in the same manner, followed by a drying between printings using vinyl based ink having benzidine yellow for the first ink and pigment green dark green for the second transparent ink.

Upon removal of the printed sheets from the drying oven, a clear coating of lacquer based on nitrocellulose is applied to protect the surface. The finished surface is characterized by a colored metallic-like shine and luster.

EXAMPLE II

Substantially the procedure of Example I is repeated using polybutyrate sheets in place of polystyrene and aluminum staples in place of chromium. Also, the overcoating of clear lacquer applied after vacuum deposition of the alumina is omitted from the process.

The polybutyrate sheets having a thin coating of aluminum thereon are screen printed with transparent inks based on nitrocellulose and alkyd resins. In the first printing the transparent ink used contains methyl violet as the colorant. In the second printing, the transparent ink contains isoindolinone yellow. In the third printing, the transparent ink used contains madder lake alizarine red as the colorant. Certain of the figures in the printed configuration are outlined with an opaque ink containing $TiO_2$ colorant. The final product is encased in a laminate of clear plastic. The product is characterized by outstanding brilliance and luster due to the reflective character of the aluminum film penetrating and transmitting light through the transparent ink printings.

EXAMPLE III

Substantially the procedure of Example I is repeated, using copper as the metal and vinyl sheets as the plastic. The vinyl sheets containing a thin film of copper are then subjected to a plurality of overprintings to create a stained glass window effect. The transparent inks used are those based on acrylic resins with a different colorant for each printing. The colorants used include quinacridone red, sodium lithol maroon light red, perylene, HR medium yellow, benzidine, orange, anthraquinone yellow-red, anthraquinone green, and anthraquinone blue. Ceramic black is used to outline areas on the printed plastic which correspond to the stained glass framing. The resulting product is one of outstanding beauty and eye appeal and has a surprising likeness to real stained glass windows.

EXAMPLE IV

Substantially the procedure of Example III is repeated, using acrylic plastic sheets and nickel as the metal deposited. The final laminate is omitted. The results are comparable to those produced in Example III.

EXAMPLE V

Molded articles of polyethylene and polypropylene are nickel plated using a standard electroplating process.

The nickel plated articles are then screen printed with transparent inks based on acrylic resins. In the first printing the colorant used is flavanthrone yellow; in the second printing, lithol rubine bluish red; and in the third printing ultramarine blue. After each printing, the plastic articles are passed through a drying oven at a temperature of 265° F. for approximately four minutes. A final coating of clear lacquer is applied over the screen printing to protect and seal it. The finish in the plastic articles is shiny, bright and colorful.

EXAMPLE VI

Substantially the procedure of Example I is repeated using cellulose acetate sheets in place of the polystyrene. The finished product is comparable to that produced according to Example I.

The invention as described is a process for applying a decorative finish to a plastic whether in sheet or shaped form. By means of the transparent inks used in the process, the reflective quality of the underlying metal film is preserved. Various modifications will be apparent to those skilled in the art and can be resorted to without departing from the spirit and scope of the invention as defined by the following claims.

What is claimed is:

1. A process for producing a decorative finish or a plastic surface comprising:
   metallizing a plastic surface to deposit a substantially uniform, thin, adherent metal film thereon;
   printing said metallized plastic surface by a silk screen process using transparent inks;
   drying said inks on said metallized plastic surface;
   wherein said plastic surface is selected from the group consisting of polyethylenes, polyvinyls, polystyrenes, polypropylenes, acrylics, polyesters, polyphenylene oxide, acrylonitrile-butadiene-styrene, nylons, polycarbonates, polyurethanes, polyimides, polybutyrates, polysulfones, cellulose acetate, melamine resins, and phenolic resins; and said printing by said silk screen process followed by drying is repeated one or more times by additional over-printings of transparent inks.

2. A process as claimed in claim 1 wherein:
said metallizing process is a vacuum deposition process.

3. A process as claimed in claim 1 further comprising:
overcoating said dry printing on said metallized plastic with a clear lacquer to seal the surface thereof.

4. A process as claimed in claim 1 further comprising:
enclosing the dry product of claim 1 in a laminate of clear plastic.

5. A process as claimed in claim 1 wherein:
said transparent inks are selected from the group consisting of those having a vehicle base of nitrocellulose, vinyl resins, acrylic resins, alkyd resins and mixtures thereof.

6. A process for producing a decorative finish on a metallized plastic surface comprising:
printing on a metallized plastic surface by a silk screen process using transparent inks; and
drying said inks on said metallized plastic surface.

7. A process as claimed in claim 6 wherein:
said printing by said silk screen process followed by drying is repeated one or more times by additional overprintings of transparent inks.

8. A process as claimed in claim 7 wherein:
said transparent inks are selected from the group consisting of those having a vehicle base of nitrocellulose, vinyl resins, acrylic resins, alkyd resins and mixtures thereof and having as the colorant, pigments and dyes which are transparent in normal concentrations of use.

9. A decorative plastic product comprising:
a plastic substrate;
a first thin adherent, substantially uniform layer of metal on said plastic substrate; and
at least one overlayer of transparent ink covering at least a part of said first metallized layer.

10. A decorative plastic product as claimed in claim 9 comprising:
a final overcoating of clear lacquer to protect and seal the surface thereof.

References Cited

UNITED STATES PATENTS

| | | | |
|---|---|---|---|
| 3,001,886 | 9/1961 | Shrewsbury et al. | 117—45 X |
| 2,889,233 | 6/1959 | Steffey | 117—45 X |
| 3,068,140 | 12/1962 | Biddle | 156—277 X |
| 3,413,171 | 11/1768 | Hannon | 156—277 |
| 3,311,486 | 3/1967 | Scharf | 117—38 X |
| 2,680,695 | 6/1954 | Judd | 117—45 X |
| 3,012,906 | 12/1961 | Anspon | 117—107 |

RALPH HUSACK, Primary Examiner

U.S. Cl. X.R.

117—45, 107; 156—277